United States Patent
Lin et al.

(10) Patent No.: US 7,978,052 B2
(45) Date of Patent: Jul. 12, 2011

(54) MICROWAVE CONTROL SYSTEM

(75) Inventors: Wei-Cheng Lin, Taipei (TW); Yu-Wen Hu, Taipei (TW)

(73) Assignee: Unified Packet Systems Corp., Taipei (TW)

( * ) Notice: Subject to any disclaimer, the term of this patent is extended or adjusted under 35 U.S.C. 154(b) by 907 days.

(21) Appl. No.: 11/984,407

(22) Filed: Nov. 16, 2007

(65) Prior Publication Data

US 2009/0079548 A1 Mar. 26, 2009

(30) Foreign Application Priority Data

Sep. 21, 2007 (TW) ................................ 96135561 A

(51) Int. Cl.
*H04Q 5/22* (2006.01)
*G08B 13/14* (2006.01)
*G08G 1/00* (2006.01)
*G07B 15/00* (2006.01)

(52) U.S. Cl. ................... 340/10.5; 340/10.1; 340/572.1; 340/928; 705/13

(58) Field of Classification Search .................. 340/928; 705/13
See application file for complete search history.

(56) References Cited

U.S. PATENT DOCUMENTS

| | | | |
|---|---|---|---|
| 5,086,389 A * | 2/1992 | Hassett et al. | 705/13 |
| 2004/0160306 A1* | 8/2004 | Stilp | 340/5.61 |
| 2006/0001528 A1* | 1/2006 | Nitzan et al. | 340/10.33 |
| 2006/0071756 A1* | 4/2006 | Steeves | 340/10.1 |
| 2006/0267772 A1* | 11/2006 | Knadle et al. | 340/572.4 |
| 2007/0159338 A1* | 7/2007 | Beber et al. | 340/572.8 |

\* cited by examiner

*Primary Examiner* — Daniel Wu
*Assistant Examiner* — Mark Rushing
(74) *Attorney, Agent, or Firm* — Birch, Stewart, Kolasch & Birch, LLP

(57) ABSTRACT

A microwave control system is applied to control a working system to execute at least one predetermined assignment, and comprises a microwave control unit, a control card and a passive control unit. A microwave illuminator of the microwave control unit is applied to send a microwave signal. After receiving the microwave signal, the control card reflects a reflection signal to the microwave control unit, wakes up from a first sleep mode to enter a first awake mode, and sends a first control signal to the passive control unit. After the microwave control unit receives the reflection signal, the passive control unit wake up from a second sleep mode to enter a second awake mode, and the passive control unit transmits a second control signal in accordance with the first control signal to the working system, so as to control the working system to execute the predetermined assignment.

15 Claims, 4 Drawing Sheets

MICROWAVE CONTROL SYSTEM

FIELD OF THE INVENTION

The present invention relates to a control system, and more particularly to a microwave control system for triggering and controlling at least one working system executing at least one predetermined assignment.

BACKGROUND OF THE INVENTION

In the daily life, in order to make a fixed system be capable of controlling a working system to execute at least one predetermined assignment in accordance with a triggering signal sent from a mobile system, it is usually necessary to implement a micro control unit and a wireless signal transceiver both into the fixed system and the mobile system, and the fixed system and the mobile system shall be always under a standby mode. Under the standby mode, the fixed system has to continuously send an identification signal, and the mobile system has to always standby to receive the identification signal.

Under the standby mode, after the mobile system enter an effective triggering region of the fixed system, the mobile system can effectively receive the identification signal, and transmit a triggering signal back to the fixed system. Then, the fixed system can transmit a control signal to the working system, so as to control the working system to execute the predetermined assignment.

Following up, a conventional electronic toll charging (ETC) system will be further disclosed to illustrate the prior arts as mentioned. Please refer to FIG. 1, which is a simplified functional block to illustrate an ETC system. As shown in FIG. 1, an ETC system 100 comprises a central control system 1 and a mobile system 2. The central control system 1 is set in a tollgate, and the mobile system 2 is installed in a toll calculator, which is set in a car.

The central control system 1 comprises a first micro control unit 11 and a first wireless signal transceiver 12 coupled with the first micro control unit 11, and the first micro control unit 11 is coupled with a working system 3. The mobile system 2 comprises a second micro control unit 21 and a second wireless signal transceiver 22 coupled with the second micro control unit 21.

The central control system 1 and the mobile system 2 are always under a standby mode. Under the standby mode, the first wireless signal transceiver 11 of the has to continuously send an identification signal S0, so as to identify whether any car passes through the tollgate; and the mobile system 2 also has to always standby to receive the identification signal S0.

After the car enters the tollgate to make a the mobile system 2 enter an effective triggering region of the central control system 1, the second wireless signal transceiver 22 can effectively receive the identification signal S0, and transmit the identification signal S0 to the second micro control unit 21. The second micro control unit 21 can calculate a toll and a balance sum of the mobile system 2, and send a triggering signal S1 back to the central control system 1. The triggering signal S1 can be transmitted to the first micro control unit 11 via the first wireless signal transceiver 12. The first micro control unit 11 can revise the balance sum of the mobile system 2, and transmit a control signal S2 to the working system 3 when the balance sum is a positive value, so as to control the working system 3 to execute the predetermined assignment of opening a gate that the car intends to pass through.

After reading above prior arts, people skilled in ordinary arts can easily realize due to that the mobile system 2 is always under the standby mode, so that the mobile system 2 must continuously consume the electricity stored therein. Therefore, in the practice application, it is necessary to charge the mobile system 2 or replace the power source therein more often to keep the mobile system 2 in a normal operation mode, so as to spend more time and money.

SUMMARY OF THE INVENTION

In the prior arts, the mobile system shall be always under the standby mode to continuously consumes the electricity stored therein, so that it is necessary to charge the mobile system or replace the power source therein more often, and spend more time and money thereafter. Thus, the primary objective of the present invention provides a microwave control system comprising a control card and a passive control unit. The control card and the passive control unit are always respectively under a first sleep mode and a second sleep mode hardly consuming any electricity unless being triggered. Only when the control card and the passive control unit are triggered, they wake up from the first sleep mode and the second sleep mode to respectively enter a first awake mode and a second awake mode, and control a working system to execute at lease one predetermined assignment.

The secondary objective of the present invention provides a microwave control system comprising a microwave illuminator and a control card, and makes the control card effectively receive a microwave signal and be triggered by the microwave signal either when the first surface or the second surface faces to the microwave illuminator.

Means of the present invention for solving the problems as mentioned above provides a microwave control system, which is applied to control a working system to execute at least one predetermined assignment, and comprises a microwave control unit, a control card and a passive control unit. A microwave illuminator of the microwave control unit is applied to send a microwave signal. After receiving the microwave signal, the control card reflects a reflection signal to the microwave control unit, wakes up from a first sleep mode to enter a first awake mode, and sends a first control signal to the passive control unit. The passive control unit is coupled with the microwave control unit and the working system. After the microwave control unit receives the reflection signal, the passive control unit wake up from a second sleep mode to enter a second awake mode, and the passive control unit transmits a second control signal in accordance with the first control signal to the working system, so as to control the working system to execute the predetermined assignment.

In a preferred embodiment of the present invention, the microwave control system comprises a microwave illuminator and a control card. The control card comprises a first antenna circuit and a second antenna circuit, the first antenna circuit is deposited on a first surface of the control card, and the second antenna circuit is deposited on a second surface of the control card opposite to the first surface. Thus, no matter the first surface or the second surface faces to the microwave illuminator, the control card can effectively receive the microwave signal.

With comparison between the prior arts and the present invention, the control card and the passive control unit are respectively under the first sleep mode and the second sleep mode in most time; therefore, it is able to save the electricity consumption of the control card and the passive control unit, so as to reduce the frequency of charging electricity or replacing power source within the control card and the passive control unit, and further save the cost in time and money. Nevertheless, through the special structural design of the antenna assembly, no matter the first surface or the second surface faces to the microwave illuminator, the control card always can receive the microwave signal, so that it can provide more convenience in actual use.

The devices, characteristics, and the preferred embodiment of this invention are described with relative figures as follows.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Due to that the microwave control system as provided in accordance with the present invention can use a microwave signal to periodically or a periodically control a working system to execute at least one assignment in a electricity-saved way for long time, and be applied to control many kinds control systems, such as access control system, identification system and production system, etc., and the combined applications are too numerous to be enumerated and described, so that only a preferred embodiment is disclosed as follows for representation.

Figure 1:
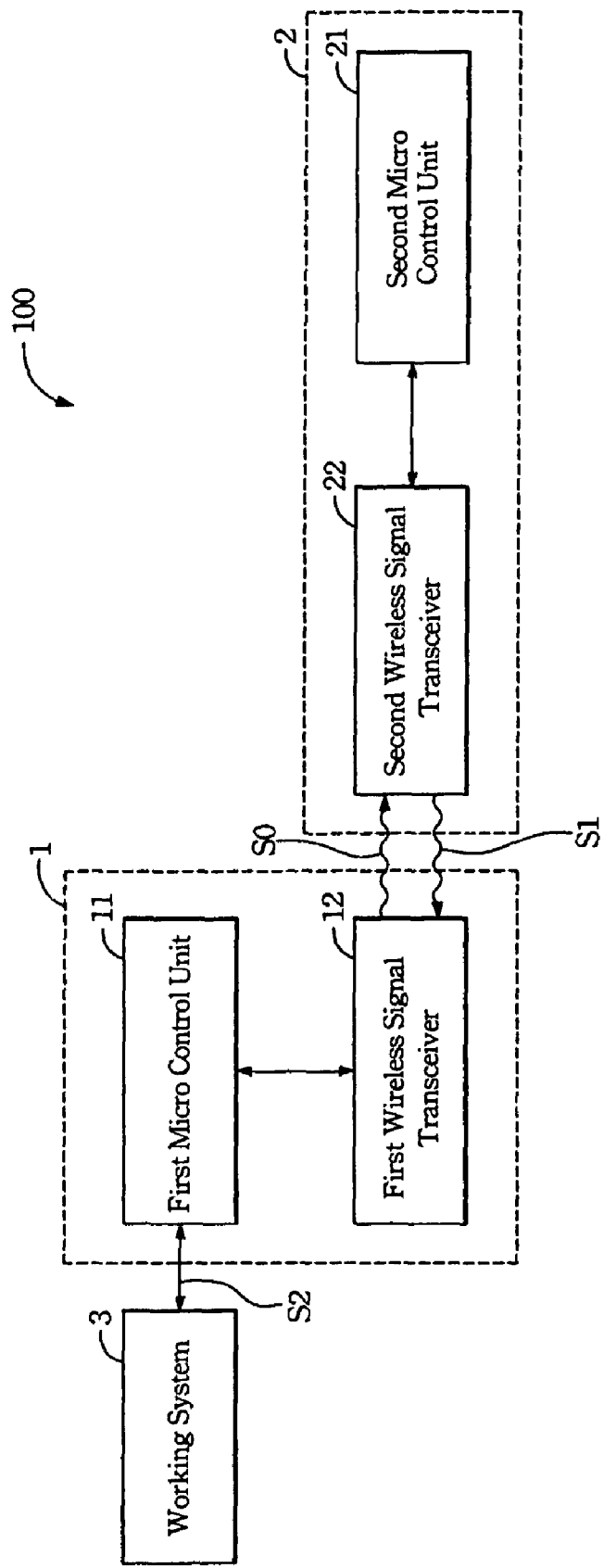
FIG. 1 is a simplified functional block to illustrate an electronic toll charging (ETC) system.
Figure 2:
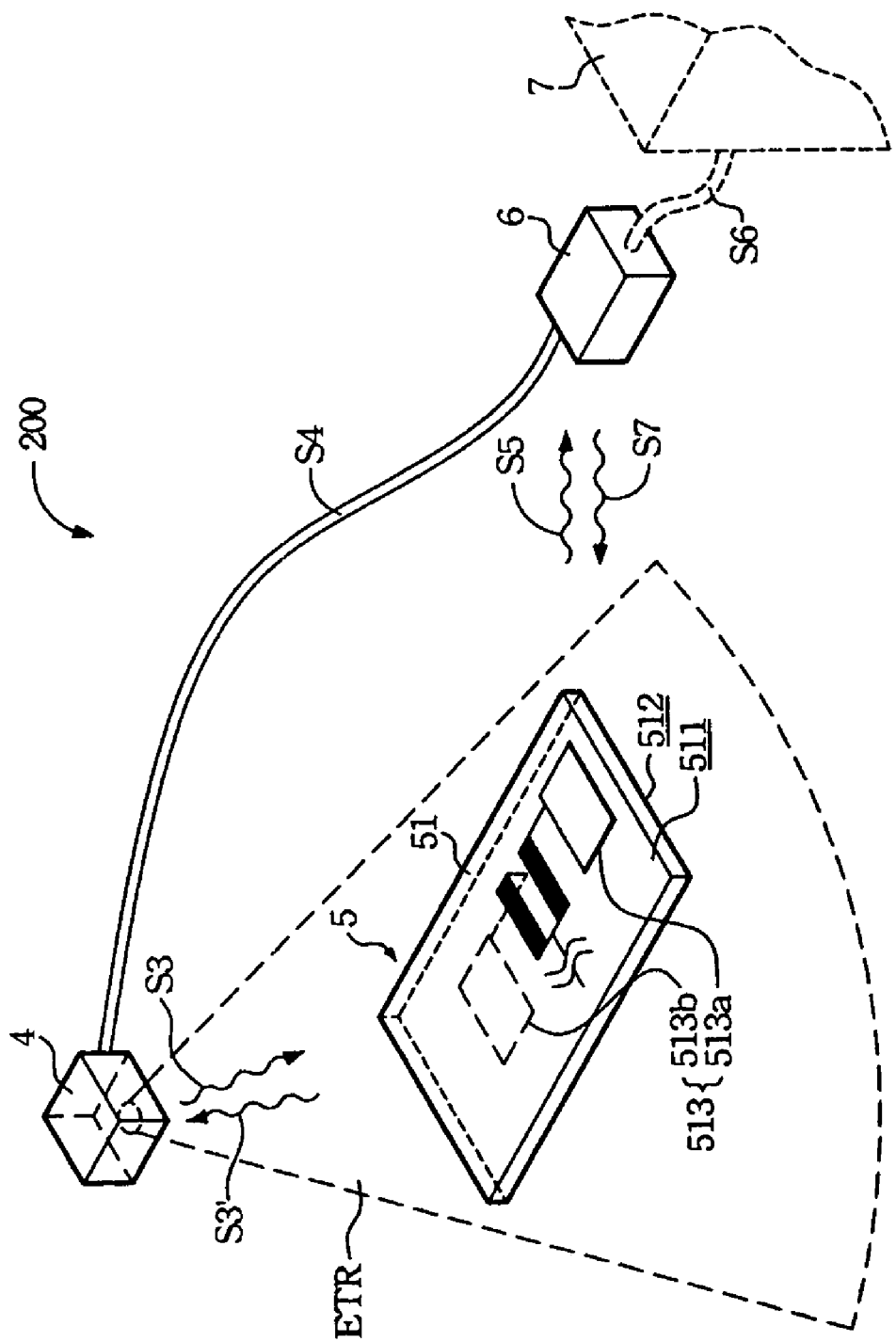
FIG. 2 illustrates a control card controlling the working system via a passive control unit after effectively receiving a microwave signal sent from a microwave illuminator in accordance with a preferred embodiment of the present invention.
Figure 3:
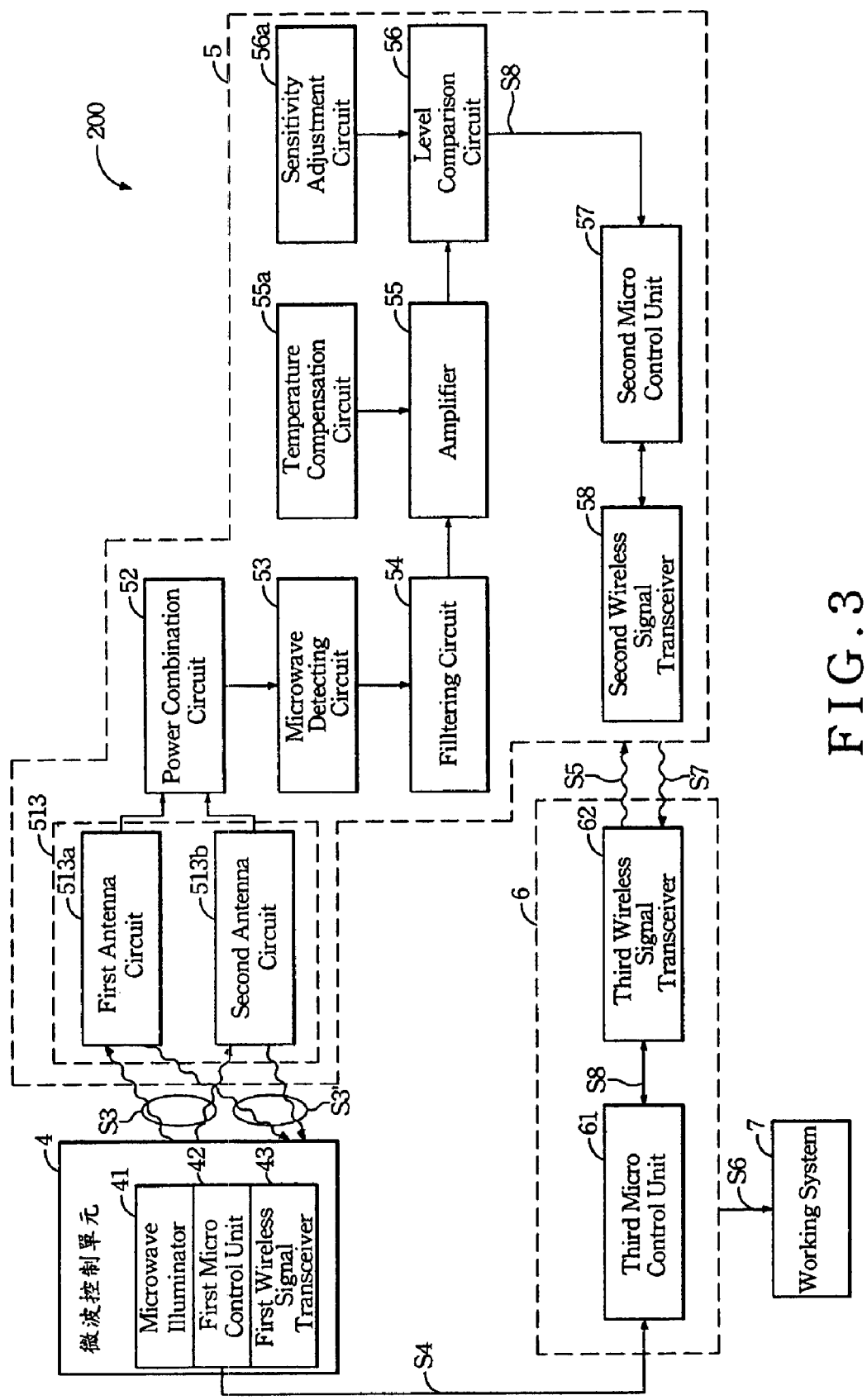
FIG. 3 illustrates a functional block diagram of the preferred embodiment of the present invention.
Figure 4A:
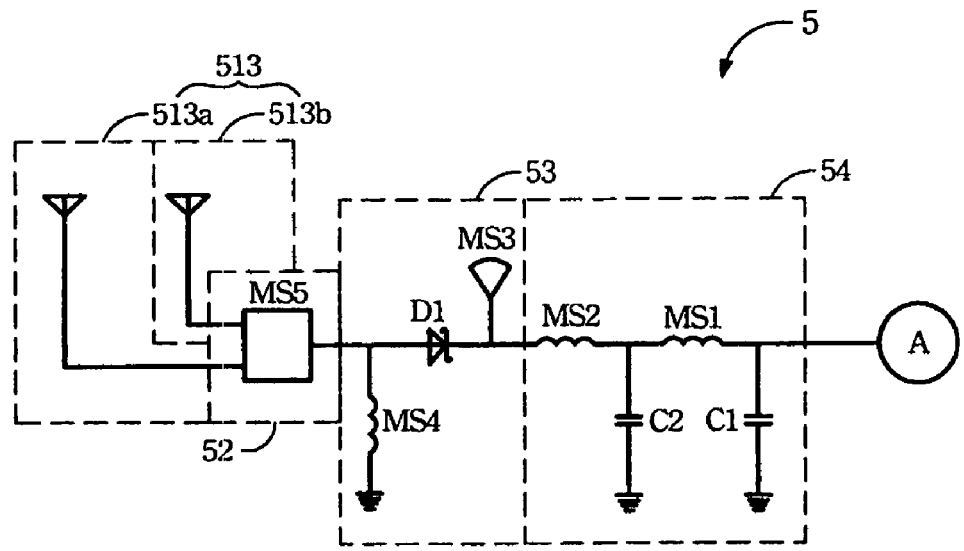
FIG. 4A and FIG. 4B illustrate two simplified circuit diagrams of the control card.
Figure 4B:
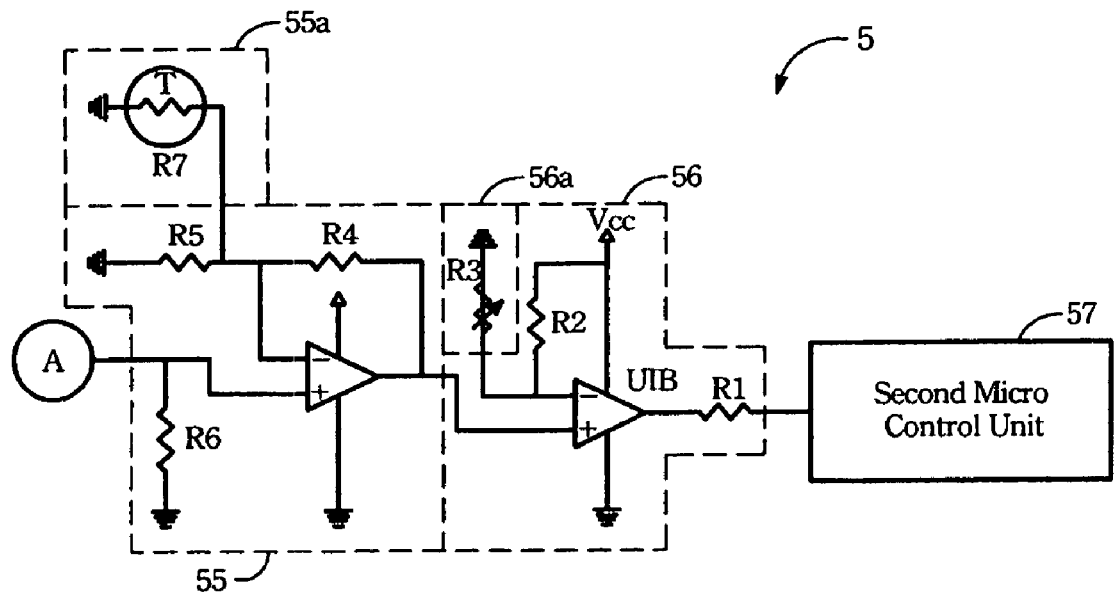

Please reference to FIG. 2 to FIG. 4B, wherein FIG. 2 illustrates a control card controlling the working system via a passive control unit after effectively receiving a microwave signal sent from a microwave illuminator in accordance with a preferred embodiment of the present invention; FIG. 3 illustrates a functional block diagram of the preferred embodiment of the present invention; and FIG. 4A and FIG. 4B illustrate two simplified circuit diagrams of the control card. As shown in the figures, a microwave control system 200 comprises a microwave control unit 4, a control card 5 and a passive control unit 6, so as to control a working system 7 to execute at least one predetermined assignment. The microwave control unit 4 comprises a microwave illuminator 41, a first micro control unit 42 and a first wireless signal transceiver 43.

Viewing from the appearance of the control card 5, the control card 5 comprises a card body having a first surface 511 and a second surface 512 opposite to the first surface 511. Meanwhile, the card body 51 further has an antenna assembly 513 comprising a first antenna circuit 513a and a second antenna circuit 513b. The first antenna circuit 513a is deposited on the first surface 511, and the second antenna circuit 513b is deposited on the second surface 512.

Except for the antenna assembly 513, the control card 5 further comprises a power combination circuit 52, a microwave detecting circuit 53, a filtering circuit 54, an amplifier 55, a temperature compensation circuit 55a, a level comparison circuit 56, a sensitivity adjustment circuit 56a, a second micro control unit 57 and a second wireless signal transceiver 58.

The power combination circuit 52 is coupled with the first antenna circuit 513a and the second antenna circuit 513b, and electrically connected with the microwave detecting circuit 53, the filtering circuit 54, the amplifier 55, the level comparison circuit 56, the second micro control unit 57 and the second wireless signal transceiver 58 in sequence. Moreover, the temperature compensation circuit 55a is coupled with the amplifier 55, and the sensitivity adjustment circuit 56a is coupled with the level comparison circuit 56. The passive control unit 6 comprises a third micro control unit 61 and a third wireless signal transceiver 62 coupled with the third micro control unit 61, and the third micro control unit 61 is coupled with the first micro control unit 42.

The microwave illuminator 41 continuously sends a microwave signal S3, the control card 5 is always under a first sleep mode, and the passive control unit 6 is always under a second sleep mode. After a user (not shown) hold or wear on the control card 5 to enter an effective triggering region ETR of the microwave illuminator 41, the first antenna circuit 513a and the second antenna circuit 513b receive the microwave signal S3, the power combination circuit 52 can combine the microwave signal S3 received by the first antenna circuit 513a and the second antenna circuit 513b, and transmit the combined microwave signal S3 to the microwave detecting circuit 53. The microwave detecting circuit 53 can transfer the microwave signal S3 to a voltage signal (not shown), and transmit the voltage signal to the filtering circuit 54. The filtering circuit 54 can filter the voltage signal and transmit the voltage signal to the amplifier 55.

The amplifier 55 can amplify the voltage signal. When the amplifier 55 amplifies the voltage signal, the temperature compensation circuit 55a can compensate the voltage signal in accordance with a temperature property of the amplifier 55, and transmit the voltage signal, which has been compensated, to the level comparison circuit 56. The level comparison circuit 56 presets a reference level, and analyzes the voltage signal to an input level. Following up, the level comparison circuit 55 can compare the input level with the reference level.

When the input level is greater than or equals to the reference level, it represents that the control card 5 is located within the effective triggering region ETR, and the first antenna circuit 513a and (or) the second antenna circuit 513b can effectively receive the microwave signal S3. Meanwhile, the level comparison circuit 56 can generate and transmit a first wake-up signal S7 to the second micro control unit 57.

On the contrary, when the input level is less than the reference level, it represents that the control card 5 is located out of the effective triggering region ETR, and neither the first antenna circuit 513a nor the second antenna circuit 513b can effectively receive the microwave signal S3. Therefore, the level comparison circuit 56 can neither generate nor transmit a first wake-up signal S8 to the second micro control unit 57.

The sensitivity adjustment circuit 56a is applied to adjust the reference level. It is obvious that whether the control card is located within the effective triggering region is decided by whether the input level is greater than or equals to the reference level; the input level is analyzed from the voltage signal; the voltage signal is transferred from the microwave signal S3; and the strength of the microwave signal S3 received by the control card 5 is decided by a signal sending distance between the control card 5 and the microwave illuminator 41, so that the input level is related to the signal sending distance. In other words, when the reference level is adjusted via the sensitivity adjustment circuit 56a, it implies that the range of effective triggering region ETR is also simultaneously adjusted.

After the second micro control unit 57 receives the first wake-up signal S8, the second micro control unit 57 can be waked up from the first sleep mode to enter the first awake mode, and transmit the first control signal S4 under the first awake mode. The first control signal S4 can be sent to the passive control unit 6, and received by the second wireless signal transceiver 62.

In another, after the microwave signal is sent to the control card 5, the control card can reflect the microwave signal S3 to transmit a reflection signal S3' to the first wireless signal transceiver 43. After the first wireless signal transceiver 43 receives the reflection signal S3', the reflection signal S3' is transmitted to the first micro control unit 42. Following up, the first micro control unit 42 can transmit a second wake-up signal S4 to the third micro control unit 61 to make the third micro control unit 61 be waked up from a second sleep mode to enter a second awake mode, and make the third micro control unit 61 transmit a second control signal S6 to the working system 7 under the second awake mode, so as to control the working system 7 to execute the predetermined assignment.

For further carrying out a feedback control to the working system 7, under the second awake mode, the third micro control unit 61 can transmit a feedback signal S7 to the control card 5. The feedback control signal S7 is received by the second wireless signal transceiver 58 and transmitted to the second micro control unit 57. Hereafter, the second micro control unit 57 can transmit the first control signal S5 in accordance with the feedback control signal S7, and the third micro control unit 61 can transmit the second control signal S6 in accordance with the first control signal S5.

People skilled in ordinary arts can easily realize that once the control card 5 is located out of the effective triggering region ETR for a specified response time interval, the second micro control unit 57 can be transferred from the first awake mode to the first sleep mode. Meanwhile, due to that the control card 5 is located out of the effective triggering region ETR, the microwave signal cannot be effectively reflected to generate the reflection signal sufficient for making the first control unit 42 to transmit the second wake-up signal S4. After a specified response time, the third micro control unit 61 will be transferred form the second awake mode to the second sleep mode. From above description, it is obvious that in most time, the control card 5 and the passive control unit 6 are under the sleep modes, i.e., the first sleep mode and the second sleep mode, which consume less electricity, so as to save the cost of charging or replacing power source. Moreover, due to that the first antenna circuit 513a and the second antenna circuit 513b are respectively deposited on the first surface 511 and the second surface 512, so that the control card 5 can be triggered by the microwave signal S3 either when the first surface 511 or when the second surface faces to the microwave illuminator 41. In other words, the control card 5 always can receive the microwave signal S3, so that it can provide more convenience in actual use.

In the preferred embodiment of the present invention, both the first antenna circuit 513a and the second antenna circuit 513b can comprise a micro-strip antenna; the microwave detecting circuit 53 can comprises at least one Schottky diode; the filtering circuit can be a low pass filter (LPF) or a band pass filter (BPF); and the amplifier 55 can be a direct current (DC) amplifier. It is undoubted that people skilled in ordinary arts can use other components with similar functions to replace the components as mentioned.

Nevertheless, when the working system 7 is an access control system, the control card 5 can be an access card, and the predetermined assignment can be an access control assignment. Similarly, when the working system 7 is an identification system, the control card 5 can be an identification card, and the predetermined assignment can be an identification assignment; when the working system 7 is a production control system, the control card 5 can be a production control card, and the predetermined assignment can be a production control assignment, the rest may be inferred by analogy. Form above disclosure, people skilled in ordinary arts can further realize that the present invention can be widely applied to control many kinds of working systems.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A microwave control system being applied to control a working system to execute at least one predetermined assignment, and comprising:
    a microwave control unit, comprising:
        a microwave illuminator for sending a microwave signal;
        a first micro control unit; and
        a first wireless signal transceiver coupled with the first micro control unit;
    a control card, comprising:
        an antenna assembly for effectively receiving the microwave signal within an effective triggering region, and generating a first wake-up signal in accordance with the microwave signal;
        a second micro control unit coupled with the antenna assembly, being waked up from a first sleep mode to enter a first awake mode after receiving the first wake-up signal, and generating a first control signal under the first awake mode hereafter;
        a second wireless signal transceiver coupled with the second micro control unit, so as to send out a first control signal;
    a passive control unit comprising:
        a third micro control unit coupled with the first micro control unit and the working system; and
        a third wireless signal transceiver for receiving the first control signal and transmitting the first control signal to the third micro control unit;
    wherein the control card reflects a reflection signal to transmit a reflection signal to the first wireless signal transceiver, the first micro control unit transmits a second wake-up signal to the third micro control unit after the first wireless signal transceiver receives the reflection signal to make the third micro control unit wake up from a second sleep mode to enter a second awake mode, and further to make the third micro control unit transmit a second control signal to the working system, so as to control the working system to execute the predetermined assignment.

2. The microwave control system as claimed in claim 1, wherein the control card comprises a card body having a first surface and a second surface opposite to the first surface, and the antenna assembly further comprises a first antenna circuit deposited on the first surface, and a second antenna circuit deposited on the second surface.

3. The microwave control system as claimed in claim 2, wherein the control card further comprises a power combination circuit coupled with the first antenna circuit and the second antenna circuit, so as to combine the microwave signal received by the first antenna circuit and the second antenna circuit.

4. The microwave control system as claimed in claim 2, wherein both the first antenna circuit and the second antenna circuit respectively comprise a micro-strip antenna.

5. The microwave control system as claimed in claim 1, wherein the control card further comprises a microwave detecting circuit electrically connected between the antenna assembly and the first micro control unit, so as to transfer the microwave signal to a voltage signal with respect to the microwave signal.

6. The microwave control system as claimed in claim 5, wherein the control card further comprises a filtering circuit electrically connected between the microwave detecting circuit and the first micro control unit, so as to filter the voltage signal.

7. The microwave control system as claimed in claim 6, wherein the control card further comprises an amplifier electrically connected between the filtering circuit and the first micro control unit, so as to amplify the voltage signal.

8. The microwave control system as claimed in claim 7, wherein the control card further comprises a temperature compensation circuit coupled with the amplifier, so as to compensate the voltage signal in accordance with a temperature property parameter of the amplifier.

9. The microwave control system as claimed in claim 7, wherein the control card further comprises a level comparison circuit electrically connected between the amplifier and the first micro control unit, so as to analyze a voltage level of the voltage signal.

10. The microwave control system as claimed in claim 7, wherein the control card further comprises sensitivity adjustment circuit coupled with the level comparison circuit, so as to adjust the effective triggering region.

11. The microwave control system as claimed in claim 7, wherein the working system is an access control system, the control card is an access control card, and the predetermined assignment is an access control assignment.

12. The microwave control system as claimed in claim 1, wherein the second control signal is generated in accordance with the first control signal.

13. The microwave control system as claimed in claim 1, wherein the third micro control unit sends a feedback control signal to the control card via the third wireless signal transceiver under the second awake mode.

14. The microwave control system as claimed in claim 13, wherein the feedback control signal is received by the second wireless signal transceiver and transmitted to the second micro control unit.

15. The microwave control system as claimed in claim 13, wherein the second micro control unit generates the first control signal in accordance with the feedback control signal.

* * * * *